United States Patent [19]

Shirasu et al.

[11] Patent Number: 5,218,258
[45] Date of Patent: Jun. 8, 1993

[54] ULTRASONIC MOTOR AND LASER BEAM WELDING APPARATUS USING THE SAME

[75] Inventors: Isao Shirasu; Takashi Akaba; Tadashi Nagashima; Yoshimasa Tsukamoto; Kyoichi Yoshioka, all of Kobe; Toshiiku Sashida, Tokyo, all of Japan

[73] Assignees: Mitsubishi Jukogyo Kabushiki Kaisha; Shinsei Corporation, both of Tokyo, Japan

[21] Appl. No.: 754,516

[22] Filed: Sep. 4, 1991

[30] Foreign Application Priority Data

Sep. 4, 1990 [JP] Japan .................... 2-232362

[51] Int. Cl.⁵ .......................................... H01L 41/08
[52] U.S. Cl. ................................ 310/323; 310/128; 219/121.63
[58] Field of Search .................. 310/323, 328; 219/121.63, 121.78

[56] References Cited

U.S. PATENT DOCUMENTS

| 4,504,760 | 3/1985 | Yamamoto et al. | 310/323 |
|---|---|---|---|
| 4,560,263 | 12/1985 | Katsuma et al. | 310/323 X |
| 4,734,610 | 3/1988 | Okumura et al. | 310/323 |
| 4,743,791 | 5/1988 | Kawai | 310/323 |
| 4,793,689 | 12/1988 | Aoyagi et al. | 310/323 X |
| 4,839,495 | 6/1989 | Kitera et al. | 219/121.63 |
| 4,893,047 | 1/1990 | Honda | 310/323 |
| 4,935,659 | 6/1990 | Naka et al. | 310/328 |
| 4,937,488 | 6/1990 | Fujie et al. | 310/323 |
| 4,980,597 | 12/1990 | Iwao | 310/323 X |
| 5,041,132 | 8/1991 | Miyata | 310/323 X |
| 5,053,670 | 10/1991 | Kosugi | 310/328 |

FOREIGN PATENT DOCUMENTS

| 0300458A1 | 1/1989 | European Pat. Off. |  |
|---|---|---|---|
| 59-86484 | 5/1984 | Japan . |  |
| 0293979 | 12/1987 | Japan | 310/323 |
| 0023071 | 1/1990 | Japan | 310/323 |
| 2-084078 | 3/1990 | Japan . |  |
| 2-119584 | 7/1990 | Japan . |  |

*Primary Examiner*—Mark O. Budd
*Attorney, Agent, or Firm*—Wenderoth, Lind & Ponack

[57] ABSTRACT

A small-sized ultrasonic motor can produce a high torque and a stable turning force. The ultrasonic motor has: a cylindrical casing, a hollow output shaft extending coaxially through the cylindrical casing supported rotatably by the casing a ring-like stator fixedly mounted on the inner surface of the cylindrical casing having piezoelectric elements fixed on the back surface thereof, a ring-like rotor mounted on the hollow output shaft and facing the front surface of the stator, and springs for pushing the rotor toward the stator. Also disclosed is a laser beam welding apparatus for welding the inner circumferential surface of a tube by using the ultrasonic motor.

10 Claims, 2 Drawing Sheets

ULTRASONIC MOTOR AND LASER BEAM WELDING APPARATUS USING THE SAME

BACKGROUND OF THE INVENTION

The present invention relates to an ultrasonic motor and a laser beam welding apparatus and, more particularly, to a hollow ultrasonic motor which is suitably used in a laser beam welding apparatus for carrying out laser beam welding in the thin heat transfer tubes of a heat exchanger.

For example, a steam generator used in a nuclear power plant is a shell-and-tube type heat exchanger, in which some of thin heat transfer tubes may experience damage for various causes. As a convenient and reliable method for repairing those damaged tubes, it is well known to insert and fix a thin cylindrical member called a sleeve in the damaged portion of the heat transfer tube.

The method of fixing the sleeve in the heat transfer tube has been exemplified by soldering or expanding methods, but it has been found that laser beam welding is very effectual. We have developed a sleeve welding apparatus, as disclosed in the specification U.S. Pat. No. 4,839,495 (corresponding to Japanese Patent Laid-Open No. 27788/1989). This apparatus has, as described therein, an optical system including a reflecting mirror for directing a welding laser beam to the inner surface of the heat transfer tube or sleeve. In order to bond the sleeve and the heat transfer tube firmly by circumferential seal welding, it is necessary to turn the optical system about its axis, and as a rotation mechanism, therefore, an electromagnetic motor or a piston-cylinder mechanism is used.

For high-quality circumferential seal welding by using a laser beam, the rotational drive mechanism is required to produce a stable turning force with high torque and to rotate at a speed suited for the welding operation. In order to meet these requirements, generally speaking, the electromagnetic motor has to be equipped with a reduction gear mechanism, as disclosed in the specification of the U.S. patent, and thus it requires a relatively large mounting space.

In laser beam welding of this kind, on the other hand, the apparatus has to be equipped with optical fiber for transmitting the laser beam and hoses for feeding cooling gas or shielding gas. Moreover, the diameter of the heat transfer tube of the steam generator, into which the laser beam welding apparatus of this kind is to be inserted, is as small as 20 mm or the like, and the rotary drive mechanism is required to be smaller in size.

Incidentally, a heat transfer tube having a diameter exceeding 20 mm could be welded by a welding apparatus using an electromagnetic motor as a rotary drive mechanism. However, a laser beam welding apparatus for a heat transfer tube having a diameter less than 20 mm cannot be practicable as long as an electromagnetic motor is used.

In a rotary drive mechanism using a piston-cylinder mechanism, on the other hand, the linear movements of the piston in the axial direction can be converted into the turning motions of the cylinder having helical grooves. The control of the rotation is very difficult, although the aforementioned hose mounting space could be retained in the piston.

SUMMARY OF THE INVENTION

It is, therefore, an object of the present invention to provide an ultrasonic motor which is small in size and which produces a high torque and a stable turning force.

Another object of the present invention is to provide a hollow type small-sized ultrasonic motor which can generate a high torque and a stable turning force while its rotations are easily controlled.

Still another object of the present invention is to provide an ultrasonic motor which is suitable as a rotary drive mechanism for a laser welding apparatus to be used for repairing the thin heat transfer tube of a heat exchanger and which is small-sized but has a space for allowing an optical fiber or a gas feeding hose to extend therethrough.

A further object of the present invention is to provide a small-sized laser beam welding apparatus which includes a hollow ultrasonic motor through which an optical fiber for transmitting a welding laser beam and another member such as gas hose can be extended into a thin heat exchanger tube so as to carry out laser beam welding therein.

According to an aspect of the present invention, there is provided an ultrasonic motor comprising a cylindrical casing, a hollow output shaft extending coaxially through the cylindrical casing and rotatably supported by the casing; a ring-like stator fixedly mounted on the inner surface of the cylindrical casing and having piezoelectric vibrators fixed on the back surface of the cylindrical casing a ring-like rotor mounted on the hollow output shaft and facing a front surface of the stator and a bias means for pushing the rotor toward the stator.

According to another aspect of the present invention, there is provided an ultrasonic motor comprising a cylindrical casing. A hollow output shaft extends coaxially through the cylindrical casing and is rotatably supported thereby. A pair of ring-like stators fixedly mounted on the inner surface of the cylindrical casing, each of the stators having piezoelectric vibrators fixed on the back surface thereof. A rotor receiver fixedly mounted on the circumferential surface of said hollow output shaft and positioned between the stators. A pair of ring-like rotors are each received in a recess of the rotor receiver and face the front surface of the corresponding stator. A pair of conical disc springs bias the rotors toward the stators.

According to still another aspect of the present invention, there is provided a laser beam welding apparatus for the inner circumferential surface of a tube which comprises: an elongated flexible tube having an optical fiber extending therein and longitudinally thereof for transmitting a laser beam therethrough. A position determining means is disposed in the vicinity of the tip end of the flexible tube for determining the position of the tube with respect to a work tube in which the flexible tube is inserted. A holding means has an expander and is disposed adjacent to the position determining means for holding the tip end of the flexible tube in the work tube. A rotary drive means is disposed closer to the tip end of the flexible tube than to the holding means. A rotary cylinder is connected to the rotary drive means to be rotated with respect to the flexible tube. A guide means is mounted on the rotary cylinder in a manner as so to rotate with respect to the rotary cylinder and is held in contact with the inner face of the work tube for supporting the rotary cylinder concentrically of the work tube. An optical train arranged within the rotary cylinder receives the laser beam emitted from the optical fiber and focuses a reflected laser beam onto the inner surface of the tube. The rotary drive means is an ultrasonic motor which comprises a cylindrical casing, a hollow output shaft extending coaxially through the cylindrical casing which is supported rotatably thereby, a ring-like stator fixedly mounted on the inner surface of the cylindrical casing and having piezoelectric vibrators fixed thereto, and a ring-like rotor mounted on the hollow output shaft and biased toward said stator. The optical fiber extends through the hollow output shaft.

In the ultrasonic motor of the present invention, flexual vibrations having a progressive wave propagating along in the circumferential direction are generated in the stator if the piezoelectric vibrators are fed with high-frequency voltages of different phases, such as voltages of sine waves and cosine waves. In the surface of the vibrating stator facing the rotor, there are established elliptical motions which propagate in the direction opposed to that of the progressive wave. Since the ring-like rotor is pushed onto the stator by the bias means, the rotor is rotationally driven in the opposite direction to the progressive wave by the frictional force established by the aforementioned elliptical motions. These rotations of the rotor are transmitted to the hollow output shaft.

As described above, the ultrasonic motor of the present invention can achieve a high torque and a stable turning force although it is given a small-sized structure, in which the hollow output shaft, the ring-like stator, the ring-like rotor and the piezoelectric vibrators are arranged in the cylindrical casing.

Moreover, the ultrasonic motor according to the present invention can generate a high torque by using a pair of ring-like stators and a pair of ring-like rotors in which the size is kept small.

Still further, the laser beam welding apparatus according to the present invention can be so reduced in size using the above-specified ultrasonic motor as a rotary drive means that the optical fiber for transmitting the welding laser beam and the gas hose are allowed to extend through the hollow output shaft of the ultrasonic motor so that the apparatus can be inserted into the thin tube.

BRIEF DESCRIPTION OF THE DRAWINGS

Other objects, features and advantages of the present invention will become apparent from the following description, taken with reference to the accompanying drawings, in which.

DESCRIPTION OF THE PREFERRED EMBODIMENTS

An ultrasonic motor according to the present invention will be described in the following with reference to FIG. 1.

Figure 1:
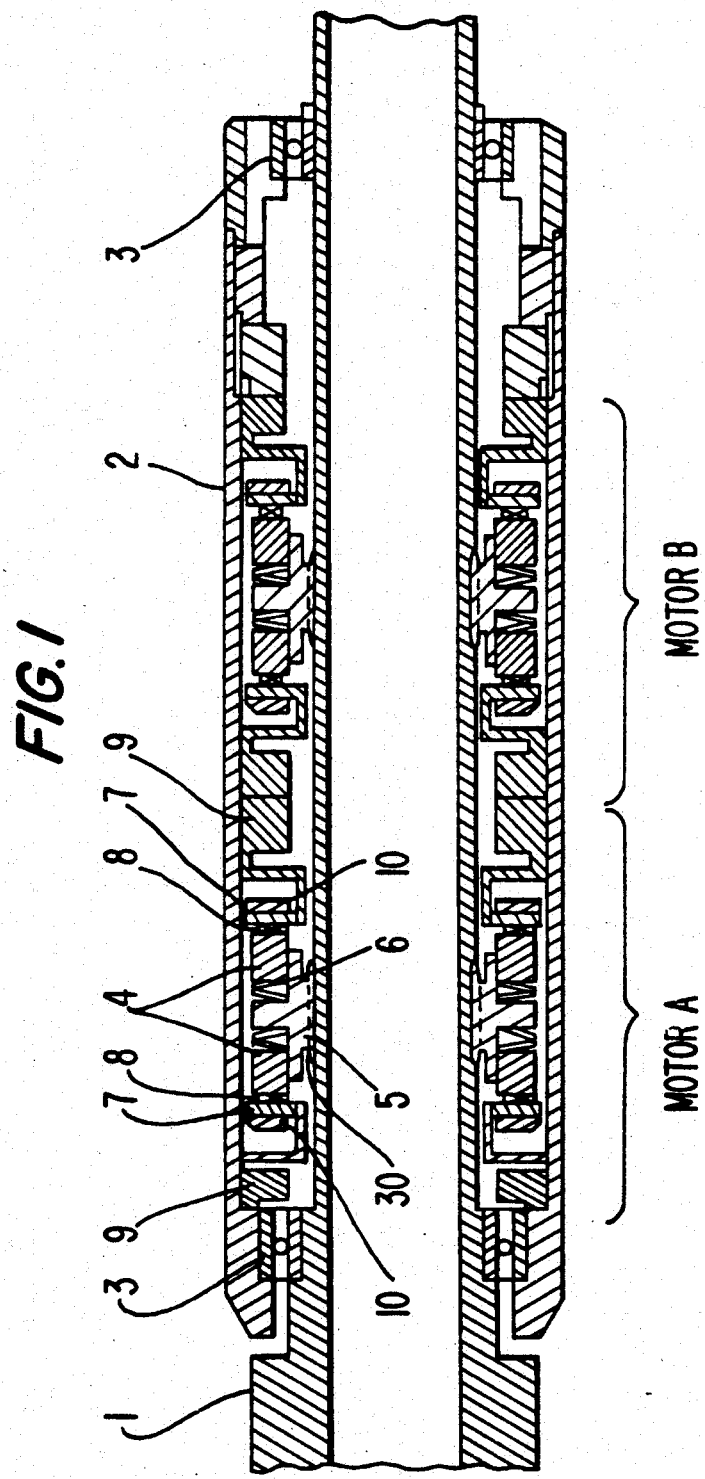
FIG. 1 is a sectional view showing the structure of an ultrasonic motor according to a first embodiment of the present invention.

As shown in FIG. 1 two motors A and B of similar structures are arranged in tandem. Thanks to this tandem arrangement, it is possible to establish a high turning force. It is quite possible, however, that only one motor may be sufficient, depending upon the turning force required. It is to be noted that this invention is not limited to the tandem arrangement.

A hollow shaft 1 is connected so as to transmit the turning force to a rotary optical system, as will be specified hereinafter, and can be understood as an output shaft. A cylindrical casing 2 encloses the hollow shaft 1 to support it rotatably by means of ball bearings 3. The casing 2 is fixed like an ordinary motor, on the frame of an apparatus on which it is to be used.

Since the motors A and B are constructed to have an identical structure, the following description will be directed to the motor A. An annular rotor retainer 5 is fixedly fitted on the hollow shaft 1 and is formed at its two ends with shoulders, on which shoulders ring-like rotors 4 are individually placed. The rotor retainer 5 is rotatably fixed on the hollow shaft 1 by a spline connection 30 as seen in FIG. 1, and therefore slight axial adjustment of the rotor retainer 5 is possible. Ring-like stators 7 are fixedly mounted in the casing 2 by means of the supports 9. Each of stators 7 is disposed to face its corresponding rotor 4, which is covered by a lining 8 at the facing surfaces. Conical disc springs 6 are sandwiched between the back surfaces of the rotors 4 and the large-diameter central portion of the rotor sleeve 5 to push the lining 8 of the rotors 4 onto the end surfaces of the stators 7. Piezoelectric elements 10 are adhered to the back surfaces of the stators 7, which surfaces do not face the stators 4. For each of the stators 7, there are circumferentially arranged at least two arcuate piezoelectric elements 10. These piezoelectric elements 10 are connected with a high frequency generator circuit.

The progressive wave type ultrasonic motors thus constructed have their operating principle disclosed in Japanese Patent Publication 17353/1989 (or Japanese Patent Laid-Open No. 148682/1983), filed by one of us. The two piezoelectric elements 10 are caused to generate flexual vibrations with a progressive wave propagating in the circumferential direction by applying high-frequency voltages with different phases such as sine waves and cosine waves.

In a surface of each stator 7 thus vibrated, which is in contact with the lining 8, there are generated small elliptical motions so that the surfaces of the stators 7 are moved in the direction opposed to the traveling direction of the waves. Since the linings 8 of the rotors 4 are pushed to be in contact with the surfaces of the stators 7 by the actions of the conical disc springs 6, they are driven in the direction opposed to that of the progressive wave by the frictional forces generated by the aforementioned elliptical motions. The rotational motions due to the frictional forces between the stators 7 and the linings 8 are transmitted from the rotors 4 to the rotor retainer 5 and further to the hollow shaft 1, thereby rotating a rotating member to be driven.

Figure 2:
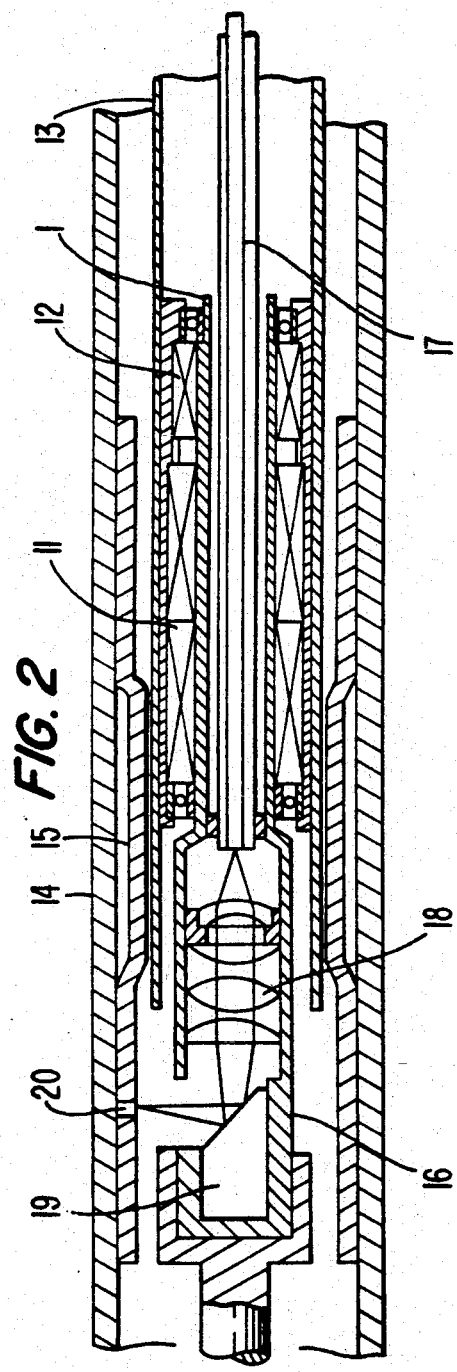
FIG. 2 is a sectional view showing the structure of a second embodiment of the present invention, in which the aforementioned ultrasonic motor is applied to a laser welding apparatus.

FIG. 2 is a section showing an embodiment of the present invention, in which the ultrasonic motor shown in FIG. 1 is applied to a laser beam welding apparatus to be used for repairing a thin heat transfer tube of a steam generator with a mending sleeve. In FIG. 2, an ultrasonic motor 11 is provided with an encoder 12 on the hollow shaft 1 shown in FIG. 1, although its detailed structure is not shown. The ultrasonic motor 11 is fixed in a tool casing 13. This tool casing 13 is connected to a flexible tube (not shown) and may be inserted into a steam generator tube 14 and a sleeve 15.

As illustrated in FIG. 2, a lens casing 16 is connected to the leading end of the hollow shaft 1. In and through this hollow shaft 1, there extends an optical fiber cable 17. Thus, the lens casing 16 is rotated by the ultrasonic motor 11. In the lens casing 16 there are accommodated a condenser lens group 18 and a mirror 19, 19 defining an optical train. By this structure, the laser beam transmitted from the optical fiber cable 17 is focused at the welding point 20 on the sleeve 15 so that it may weld the inner surface of the sleeve 15 circumferentially while the lens casing 16 is rotated by the ultrasonic motor 11.

Figure 3:
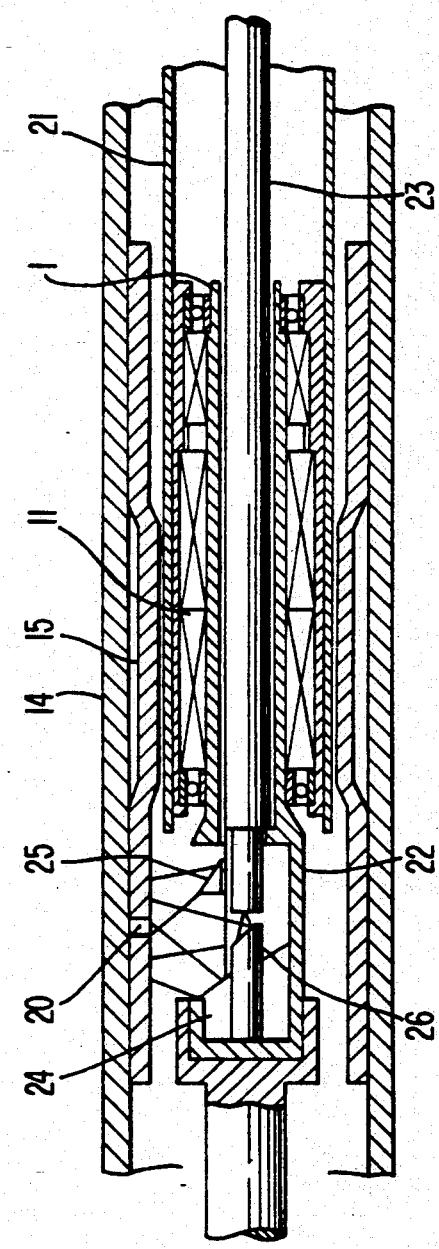
FIG. 3 is a sectional view showing the structure of the third embodiment of the present invention, in which the aforementioned ultrasonic motor is applied to a visual inspection apparatus.

FIG. 3 is a section showing the structure of a case in which the ultrasonic motor in FIG. 1 is applied to a visual inspection apparatus for inspecting the welded point 20 illustrated in FIG. 2. In FIG. 3, the ultrasonic motor 11 is mounted in a tool casing 21, and a mirror casing 22 is connected to the leading end of the hollow shaft 1. In and through this hollow shaft 1, there extend both a fiber scope 23 and an illumination cable (not shown).

The mirror casing 22 is equipped with illumination mirrors 24 and 25 and a visual inspection mirror 26. With this structure, the welded point 20 is observed with the fiber scope 23 by illuminating the welded point 20 and its vicinity with the illumination mirrors 24 and 25 and by reflecting the state of the welded point 20 by the visual inspection mirror 26. Since, in this case, the mirror casing 22 is rotated by the ultrasonic motor 11, it is possible to observe the welded points 20 distributed along a circumference of the sleeve.

As has been described hereinbefore, according to the present invention, it is possible to provide an ultrasonic motor which is small-sized but can establish a stable turning force with a high torque.

According to the present invention, moreover, it is possible to provide a laser beam welding apparatus which is so reduced in size that it can be inserted into a thin tube, such as the heat transfer tube of a steam generator to subject the tube to laser beam welding.

What is claimed is:

1. An ultrasonic motor, comprising:
a cylindrical casing having an inner surface;
a hollow output shaft having an outer circumferential surface extending coaxially through said casing and rotatably supported by said casing;
a pair of thin annular stators, each said thin annular stator having an annular support member fixedly mounting said thin annular stator on said inner surface of said cylindrical casing, each said thin annular stator having a front surface and a back surface, and each said thin annular stator having a piezoelectric element fixed on said back surface thereof;
a rotor receiver mounted so as to be fixed with said hollow output shaft in rotation and so as to be axially adjustable on said outer circumferential surface thereof, said rotor receiver being positioned between said thin annular stators and having a center flange and a pair of recesses facing respective said front surfaces of said stators;
a pair of annular rotors received in respective said recesses of said rotor receiver so as to face the respective said front surfaces of said stators; and
a pair of conical disc springs, each said spring being seated between a respective said rotor and said center flange of said rotor receiver for biasing said rotors toward said stators with equalized forces.

2. The ultrasonic motor of claim 1, wherein said hollow output shaft is rotatably supported in said cylindrical casing by ball bearings provided at the ends of said cylindrical casing.

3. The ultrasonic motor of claim 1, wherein each said rotor has a lining thereon for engagement with the respective said front surface of said stator.

4. The ultrasonic motor of claim 1, wherein each said stator has at least two said piezoelectric elements fixed on said back surface thereof.

5. The ultrasonic motor of claim 1, wherein said rotor receiver is mounted on said hollow output shaft by a spline connection.

6. A laser beam welding apparatus, comprising:
an elongated flexible tube having an optical fiber extending therein for transmitting a laser beam therethrough;
a cylindrical casing connected to said flexible tube, said cylindrical casing having an inner surface;
a hollow shaft having an outer circumferential surface extending in said cylindrical casing and rotatably mounted in said cylindrical casing, said optical fiber extending in and through said hollow shaft;
a lens casing connected with said hollow shaft having an optical train therein for focusing a laser beam received from said optical fiber; and
rotary drive means for rotating said hollow shaft to rotate said lens casing for moving the laser beam, wherein said rotary drive means is an ultrasonic motor comprising:
a pair of thin annular stators, each said thin annular stator having an annular support member fixedly mounting said thin annular stator on said inner surface of said cylindrical casing, each said thin annular stator having a front surface and a back surface, and each said thin annular stator having a piezoelectric element fixed on said back surface thereof;
a rotor receiver mounted so as to be fixed with said hollow output shaft in rotation and so as to be axially adjustable on said outer circumferential surface thereof, said rotor receiver being positioned between said thin annular stators and having a center flange and a pair of recesses facing respective said front surfaces of said stators;
a pair of annular rotors received in respective said recesses of said rotor receiver so as to face the respective said front surfaces of said stators; and
a pair of conical disc springs, each said spring being seated between a respective said rotor and said center flange of said rotor receiver for biasing said rotors toward said stators with equalized forces.

7. The laser beam welding apparatus of claim 6 wherein said hollow shaft is rotatably supported in said cylindrical casing by ball bearings.

8. The laser beam welding apparatus of claim 6, each said rotor has a lining thereon for engagement with the respective said front surface of said stator.

9. The laser beam welding apparatus of claim 6, wherein each said stator has at least two said piezoelectric elements fixed on said back surface thereof.

10. The laser beam welding apparatus of claim 6, wherein said rotor receiver is mounted on said hollow output shaft by a spline connection.

* * * * *